United States Patent [19]

Tuszko et al.

[11] Patent Number: 4,927,298
[45] Date of Patent: May 22, 1990

[54] CYCLONE SEPARATING METHOD AND APPARATUS

[76] Inventors: Wlodzimier J. Tuszko, 6083 Fremont Cir., Camarillo, Calif. 93010; Wojciech J. Tuszko, 427 S. Manhattan Pl., Apt. 104A, Los Angeles, Calif. 90020

[21] Appl. No.: 210,371

[22] Filed: Jun. 23, 1988

Related U.S. Application Data

[63] Continuation-in-part of Ser. No. 158,916, Feb. 22, 1988, abandoned.

[51] Int. Cl.⁵ .................... B65G 53/60; B65G 53/62
[52] U.S. Cl. ..................................... 406/173; 209/211
[58] Field of Search ................ 406/173, 175, 168, 46, 406/93, 109; 209/211, 144; 55/459.1

[56] References Cited

U.S. PATENT DOCUMENTS

| | | | |
|---|---|---|---|
| 1,353,431 | 9/1920 | Sims | 55/459.1 X |
| 2,153,026 | 4/1939 | Ringius | 55/459.1 |
| 4,140,632 | 2/1979 | Boivin | 209/211 X |
| 4,737,271 | 4/1988 | Childs | 209/211 X |
| 4,743,363 | 5/1988 | Darrow | 55/459.1 X |
| 4,797,203 | 1/1989 | Macierewicz | 55/459.1 X |
| 4,810,264 | 3/1989 | Dewitz | 55/459.1 X |

FOREIGN PATENT DOCUMENTS

| | | | |
|---|---|---|---|
| 667712 | 7/1963 | Canada | 209/211 |
| 1131734 | 2/1957 | France | 209/211 |
| 25756 | 6/1986 | Japan . | |
| 1139512 | 2/1985 | U.S.S.R. | 209/211 |
| 1164172 | 6/1985 | U.S.S.R. | 406/173 |
| 1197741 | 12/1985 | U.S.S.R. | 406/173 |
| 1386312 | 4/1988 | U.S.S.R. | 209/144 |
| 2194208 | 3/1988 | United Kingdom | 406/173 |

*Primary Examiner*—Joseph F. Peters, Jr.
*Assistant Examiner*—James M. Kannofsky
*Attorney, Agent, or Firm*—Fulwider, Patton, Lee & Utecht

[57] ABSTRACT

The improved cyclone separating method and apparatus provide an artificial air core into the cyclone to ensure the steady and high separation efficiency independent of increasing the feed flow rate or the feed solids concentration. Use of the artificial air core makes it possible to apply a control discharge valve to vary the amount of underflow collected according to the required feed flow rate and feed solids concentration for a given technological operation. Use of the artificial air core makes it possible to apply an underflow product collector with a discharge valve to manually or automatically vary the amount of underflow and to change a manner of collection of the underflow stream to be either continuous or periodical. Use of the artificial air core makes it possible to introduce a compressed air into air duct to control the outflow velocities.

6 Claims, 2 Drawing Sheets

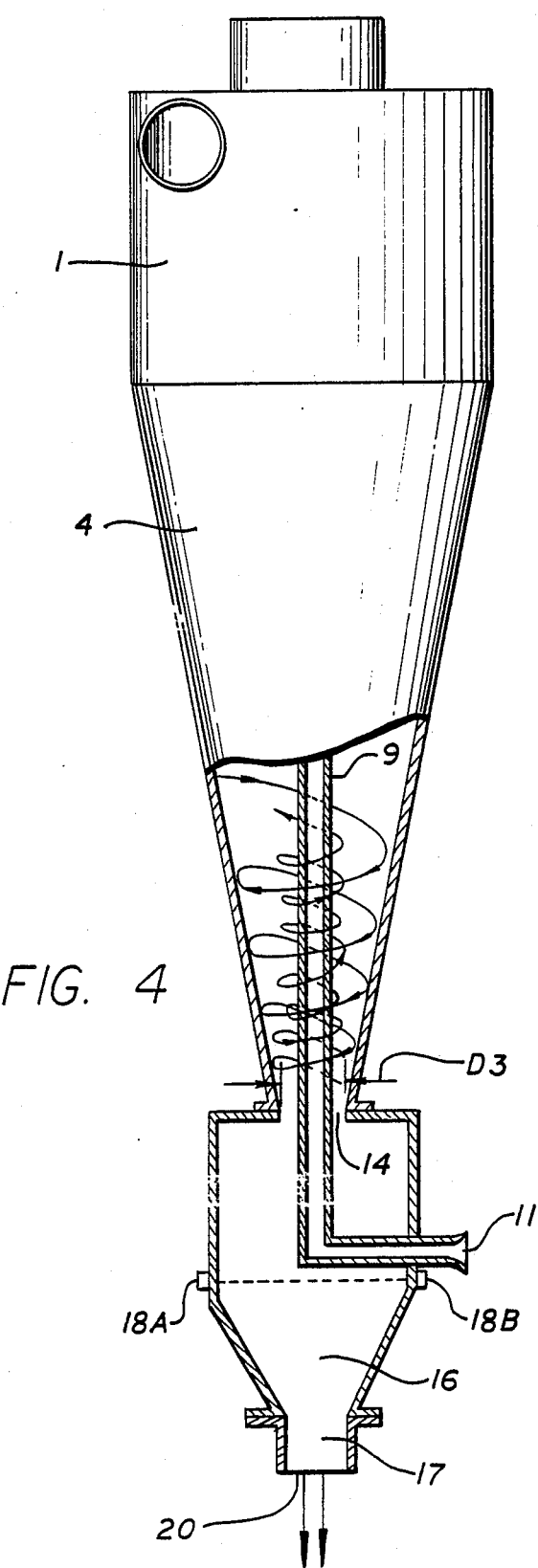
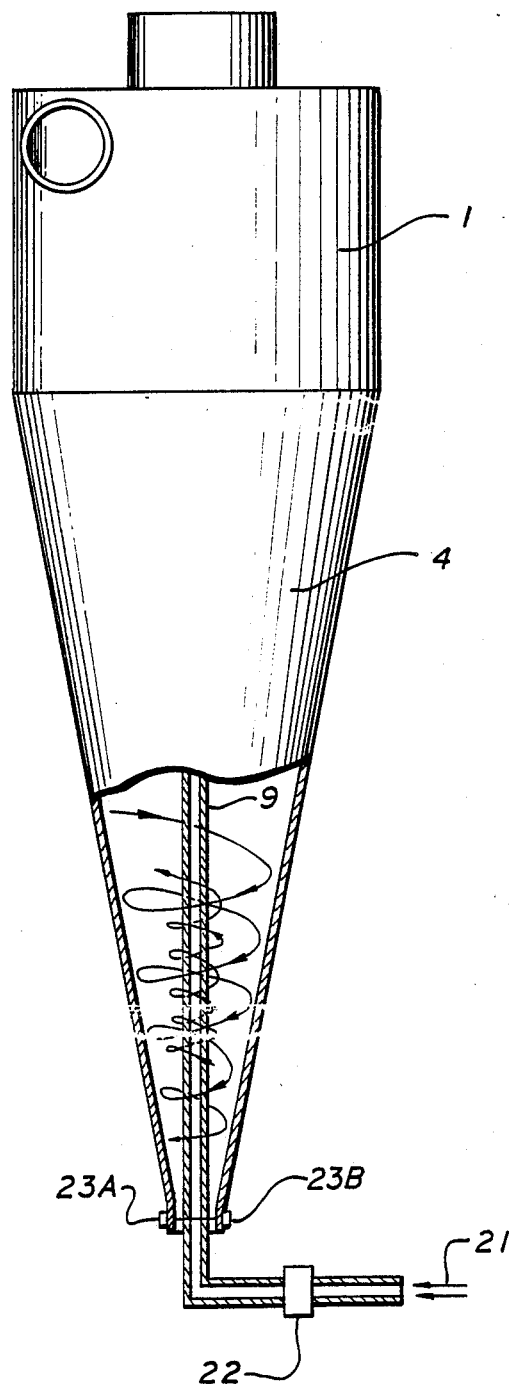
FIG. 4
FIG. 5

CYCLONE SEPARATING METHOD AND APPARATUS

RELATED APPLICATIONS

This application is a continuation-in-part of U.S. application Ser. No. 07/158,916 filed Feb. 22, 1988, now abandoned.

FIELD OF THE INVENTION

This invention relates to a method and apparatus for continuous separation of solid-solid, solid fluid, gas-liquid, liquid-liquid, fluid suspension of particulate material or mixtures gas-liquid or liquid-liquid. More specifically, the invention is directed to considerably increasing the separation efficiency of cyclones.

BACKGROUND

An early cyclone method and apparatus is known from U.S. Pat. No 453,105 (Bretney), issued May 26, 1891, in which there are two stages, in line, in the separating cyclone. A frequent problem with this and later cyclone devices is that efficiency of separation is markedly decreased after either capacity of feed solids concentration are increased. Later cyclone designs eliminated the small in-line second stage cyclone, but introduced only slight construction changes, not changing, however, the general principle of cyclone operation and not eliminating these disadvantages.

It is therefore one object of the present invention to provide a method and apparatus to separate particulate fluid suspension or liquid mixtures with high and stable efficiency for a wide range of feed capacity and feed solids concentration.

A further object of the present invention is to reduce the number of growing underflow apexes, which have to be used for an increased capacity or feed solids concentration to avoid a decreasing of given cyclone's separation efficiency.

Still another object of the present invention is to reduce the number of cyclone sizes, because the range of the capacity with the high separation efficiency is wider for given unit.

BRIEF DESCRIPTION OF THE INVENTION

This invention relates to a device for separation of particulate fluid suspensions or liquid mixtures known as a cyclone separator, in which centrifugal forces of the revolving particulate suspension or liquid mixture cause separation of them respectively into finer and coarser or lighter and more dense fractions. A high separation efficiency of a given cyclone results from a relatively small feed capacity or feed solids concentration when an air core is created along the central axis of the revolving suspension or liquid mixture load. But if a conventional cyclone receives the feed capacity or feed solids concentration at a rate 1.5–2 times greater and later more, then the air core becomes weaker and later disappears, simultaneously the separation efficiency is gradualy diminished. If,for example, a feed capacity is increased 3 times or feed solids concentration is increased up to 30%–40% then the separation efficiency, expressed by the so called separation range, is aggravated about 2 times in comparison to the situation with the air core.

To avoid this phenomenon,the present invention provides the introduction of a steady artificial air core to provide a high and steady separation efficiency independent of both an increase of flow rate or feed capacity, and feed solids concentration for a given cyclone. The design of an artificial air core makes it possible to introduce an underflow product control discharge valve with or without a collection container for this product. This improvement can greatly decrease the amount of presently used cyclone sizes and, simultaneously, permit a high flow rate or feed capacity, and high feed solids concentration.

BRIEF DESCRIPTION OF THE DRAWINGS

FIG. 4 is a partial sectional view of a third embodiment of the AAC cyclone with an underflow product collector and with an automatic or manually controlled discharge valve.

FIG. 5 is a partial sectional view of a fourth embodiment of the AAC cyclone with supplied compressed air and with an automatic or manually controled compressed air valve.

DETAILED DESCRIPTION OF THE INVENTION

Figure 1:
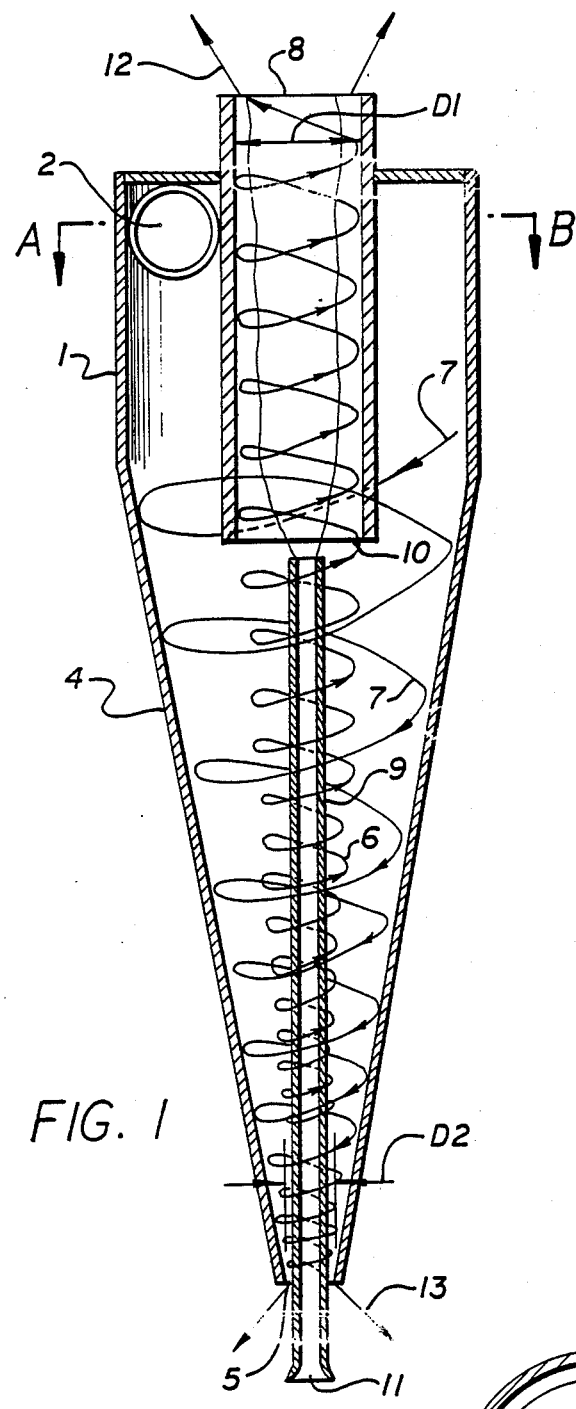
FIG. 1 is a cross-sectional elevational view of an artificial air core (AAC) cyclone.
Figure 2:
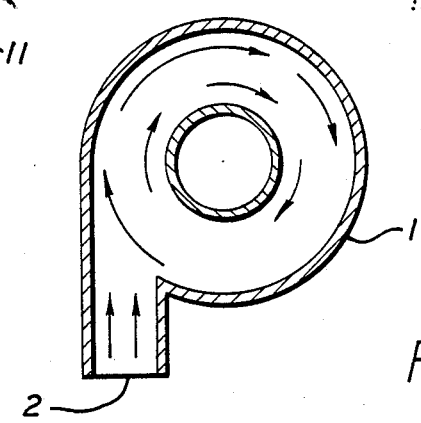
FIG. 2 is a cross sectional view of an artificial air core (AAC) cyclone taken along line A–B of FIG. 1.

The preferred method and apparatus for separation of particulate suspensions or liquid mixtures which ensure the steady and high separation efficiency, independent of increasing flow rate, feed capacity, and feed solids concentration is illustrated in FIG. 1 and FIG. 2. A cyclone separator for separating, thickening, or cleaning particulate fluid suspensions or liquid mixtures which are centrifugally separable, is comprised of a cylindrical portion 1 having an inlet duct 2 for introduction of a feed suspension or feed mixture in a tangential direction. An exhaust or pipe 3 of a diameter $D_1$ extends through the top or ceiling wall of the cylindrical portion 1. A frusto-conical portion 4 extends below the straight cylindrical portion 1. An outlet 5 of a diameter $D_2$ for separated heavier or coarser product at the bottom of the frusto-conical portion 4 is axially aligned with the exhaust pipe 3. In the portions 1 and 4 together, the feed suspension or feed mixture flows in a helical swirling flow pattern so as to establish counterflowing inner 6 and outer 7 vortexes within the separating chamber, inherently causing solids in the fluid flow which are smaller or lighter to move to the inner vortex 6 and exit through the exhaust pipe 3 as a smaller or lighter product stream or overflow 12. Ingredients in the fluid flow which are coarser or heavier move to the outer vortex 7 and exit through the outlet 5 as a coarser or heavier product stream as an underflow 13.

To properly activate the cyclone inside the inner vortex 6 and along its central axis a natural air core 8 has to be created. The air core is enlarged in the pipe 3. But if the flow rate or feed solids concentration increases over 1.5 to 2 times in relation to the situation with the natural air core, then the natural air core disappears. To maintain a stable and continuous air core 8 a special air duct 9 is introduced as a lower air connection 9 between the bottom 10 of the exhaust pipe 3 and outer atmosphere 11. It is prefered that this artificial lower air connection duct 9 be located on the axis of the cyclone, or on the axis of inner 6 and outer 7 vortexes. Artificial lower air connection duct or artificial air core (AAC) 9 comprises a duct of a smaller cross sectional flow area than exhaust pipe 3 and has its upper end located in the region of exhaust pipe bottom 10 and its lower end is open to the outer atmosphere 11, as for example is shown in FIG. 1. Air core duct 9 is mounted to have a stable position. The pressure of the feed suspension or feed liquid mixture introduced into the inlet duct 2 for the cyclone of the invention can be smaller than for presently used conventional cyclones.

Figure 3:
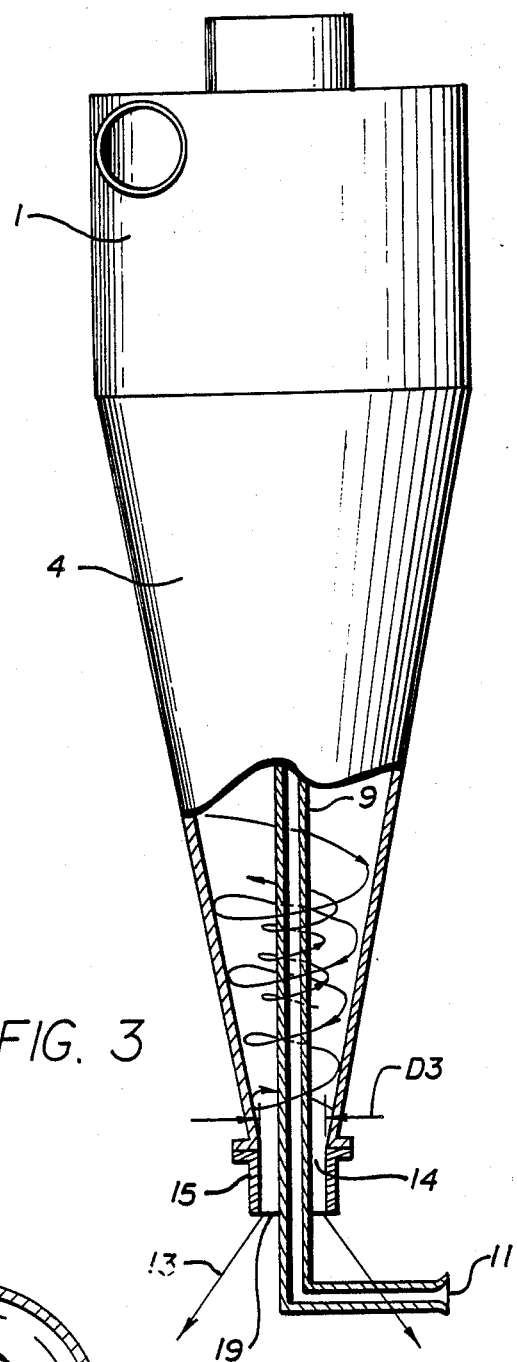
FIG. 3 is a partial sectional view of a second embodiment of the ACC cyclone with an underflow discharge control valve.

A second embodiment of the artificial air core AAC cyclone, with an underflow discharge control valve 15 is illustrated in FIG. 3. To provide a wider range of feed flow rates with a steady, high separation efficiency, the diameter D3 of the underflow aperture 14 is preferably larger than $D_2$. An underflow product discharge valve 15 is attached on the bottom of conical portion 4 and axially to it to permit changing its outlet diameter 19 from a minimum up to a diameter close to the diameter $D_1$ of the overflow exhaust pipe 3. In this embodiment the artificial air core duct extends through the discharge valve 15 and the discharge valve lower outlet has a lateral position.

A third embodiment of the artificial air core AAC cyclone with an underflow product collector 16 and with an automaticaly controlled underflow product discharge valve 17 is illustrated in FIG. 4, To provide a wider range of feed flow rates with steady, high separation efficiency and high thickening of underflow product, the underflow apperture 14 diameter D3 is preferably larger than D2. An underflow product collector 16 is tightly attached on the bottom of the conical portion 4. This collector 16 having a cross-section smaller than a cross-section of said cyclone cylindrical portion 1, with a pyramidally shaped bottom is equipped with underflow discharge valve 17 that may be automatically controlled by means of an underflow product density sensor as for example is shown in FIG. 4 as a device with an emitter 18a and a detector 18b. The effective diameter opening of discharge valve 17 at outlet 20 can be changed from a minimum up to a diameter close to the diameter D1 of the overflow exhaust pipe 3. In this embodiment the lower outlet of the artificial air core duct preferably has a lateral position extending laterally through the underflow product collector. An automatic means 18a, 18b to control underflow product discharge valve provides a continuous as well as a periodical manner of collection of the underflow stream.

A fourth embodiment of the AAC Cyclone wth supplied compressed air is illustrated in FIG. 5. To provide control over flow rate for underflow and overflow product streams, as well as control of outflow velocities, compressed air 21 is delivered into the air duct 9. The compressed air valve 22 can be automatically controlled, for example, by means of an underflow outlet sensor, shown in FIG. 5 as a device with an emitter 23A and a detector 23B.

A working model of AAC Cyclone was designed, built and tested. The test results confirmed the above mentioned advantages of AAC Cyclone. A water test of the 2.5 inch diameter model indicated that a steady and strong air core is created in the overflow exhaust pipe by as small feed pressure as about 2.2 PSI in a comparison to about 7.2 PSI for a conventional cyclone. A suspension test using a feed solids concentration of about 30% and a feed pressure of about 2.2 PSI indicated that a steady and strong air core is maintained. If compressed air is introduced into the air duct underflow velocity is increased.

This invention is not to be limited to the embodiments shown in the drawings or described in the description which are given by way of example and not by way of limitation but only in accordance with the scope of the appended claims.

We claim:

1. In a method for separating a feed comprising particulate suspensions of liquid mixtures delivered in fluid flow to a cyclone separator of the type having an axially elongated cylindrical-conical separating chamber, a conical bottom portion, a cylindrical upper portion in said chamber, an exhaust pipe having bottom region in said cylindrical portion, and an inlet duct in said cylindrical portion for introducing said feed into said cylindrical portion in a tangential direction in a helical swirling flow pattern so as to establish within the separating chamber counterflowing inner and outer vortexes, causing a lighter portion of said feed to move to the inner vortex and exit through said exhaust pipe in the top or ceiling wall of the cylindrical portion as overflow and a coarser or heavier product to move to the outer vortex and exit through the bottom outlet in said conical portion as underflow; the improvement of the method comprising:

introducing a steady supply of air into the bottom region of said exhaust pipe to maintain a steady air core in said exhaust pipe.

2. The improved method according to claim 1 comprising introducing said steady supply of air through an air duct passing axially through said conical bottom portion.

3. The improved method according to claim 2 further comprising introducing compressed air into the air duct.

4. An improved cyclone apparatus of the type having an axially elongated separating chamber; said chamber having an upper cylindrical portion and a lower conical portion; said lower conical portion having a bottom outlet for an underflow product stream; an overflow exhaust pipe having a bottom region in said cylindrical portion; and an inlet duct in said cylindrical portion for introducing a feed into said cylindrical portion in a tangential direction; the improvement in said cyclone apparatus comprising:

means for introducing a steady supply of air into said overflow exhaust pipe to maintain a steady artificial air core in said exhaust pipe;
   discharge valve means for controlling said underflow product stream; and an underflow product container.

5. The improved apparatus according to claim 4 wherein said means for introducing a steady supply of air comprises a duct extending between the bottom region of said overflow exhaust pipe and the atmosphere and having a cross section smaller than the cross section of the overflow exhaust pipe.

6. An improved apparatus according to claim 5 further comprising a means for supplying a compressed air into an entry of the air duct.

* * * * *